Aug. 11, 1925. 1,548,870

C. N. CRAFTON

GUARD

Filed Dec. 11 1924

Inventor
C. N. Crafton
By C.A. Snow & Co.
Attorneys

Patented Aug. 11, 1925.

1,548,870

UNITED STATES PATENT OFFICE.

CHARLES N. CRAFTON, OF OWENSBORO, KENTUCKY.

GUARD.

Application filed December 11, 1924. Serial No. 755,239.

*To all whom it may concern:*

Be it known that I, CHARLES N. CRAFTON, a citizen of the United States, residing at Owensboro, in the county of Daviess and State of Kentucky, have invented a new and useful Guard, of which the following is a specification.

The present invention relates to a guard especially designed for use with motor vehicles, the primary object of the invention being to provide a guard to be positioned adjacent to the front seat of a motor vehicle to prevent the person riding on the seat with the driver of the vehicle from being thrown forwardly, through the windshield, should the vehicle be suddenly stopped.

Another important object of the invention is to provide a device of this character which may be moved to a position to lie adjacent to the instrument board of the vehicle so that the guard will not in any way obstruct the passage of persons to the seat.

A further object of the invention is to provide means whereby the guard may be held in various positions with respect to the body of the person seated behind the guard.

A still further object of the invention is the provision of means which may be gripped by the person seated therebehind to steady himself while the vehicle is passing over irregular road surfaces.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made without departing from the spirit of the invention.

Referring to the drawing.

Figure 1:
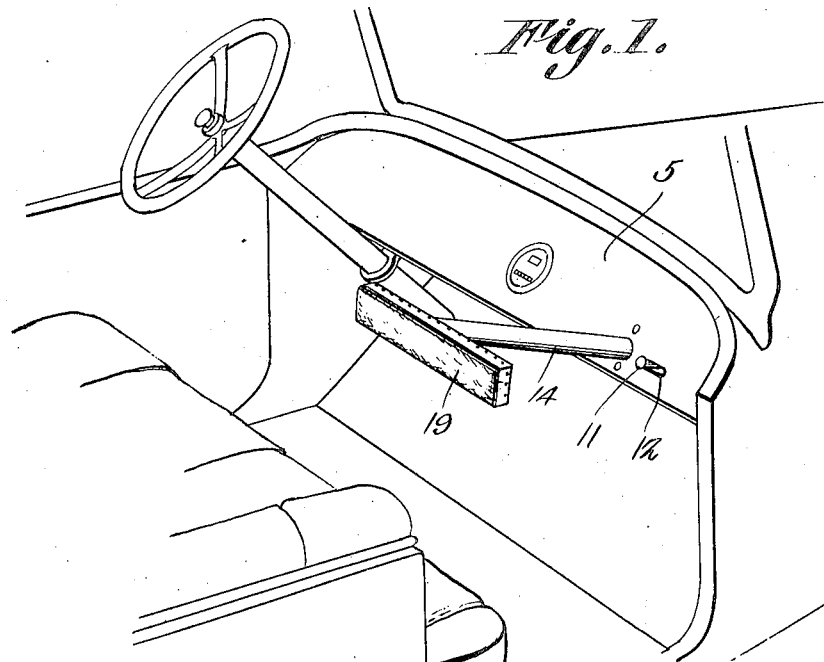
Figure 1 is a perspective view illustrating a guard constructed in accordance with the invention as supported adjacent to the instrument board of a motor vehicle.

Referring to the drawing in detail, the reference character 5 indicates the instrument board of a motor vehicle which is supplied with an opening adjacent to which the tubular supporting section 6 is positioned the member 6 being formed with the flange 7 at its outer end through which a suitable securing means may extend, in securing the supporting section to the vehicle.

The opposite end of the tubular supporting member 6 is formed with a flange 8 that fits against the under surface of the instrument board 5 where it is secured in any suitable and well known manner. Secured adjacent to the flange 8 is a tubular latch supporting section 9 in which the latch 10 is mounted, the latch having one end thereof extending through an opening in the supporting section 6, the opposite end indicated at 11 constituting the handle for the latch. As shown, the handle moves in an elongated opening 12 formed in the instrument board, the action of the latch member to release the guard, being against the tension of the coiled spring 13.

The reference character 14 indicates the tubular body portion that moves in the tubular supporting section 6, the body portion 14 being provided with openings 15 to accommodate the latch member 10, whereby the body portion 14 may be held in various positions of adjustment.

Formed in the tubular supporting member 6, is a groove 16 that extends longitudinally thereof, which groove accommodates the rib 17 extending from the body portion 14, so that the body portion will be prevented from rotation within the tubular supporting member 6.

The outer end of the tubular body portion 14 is flanged as at 17', which flange has openings to accommodate the securing screws 18 that pass into the padded member 19 to secure the padded member to the body portion.

Figure 2:
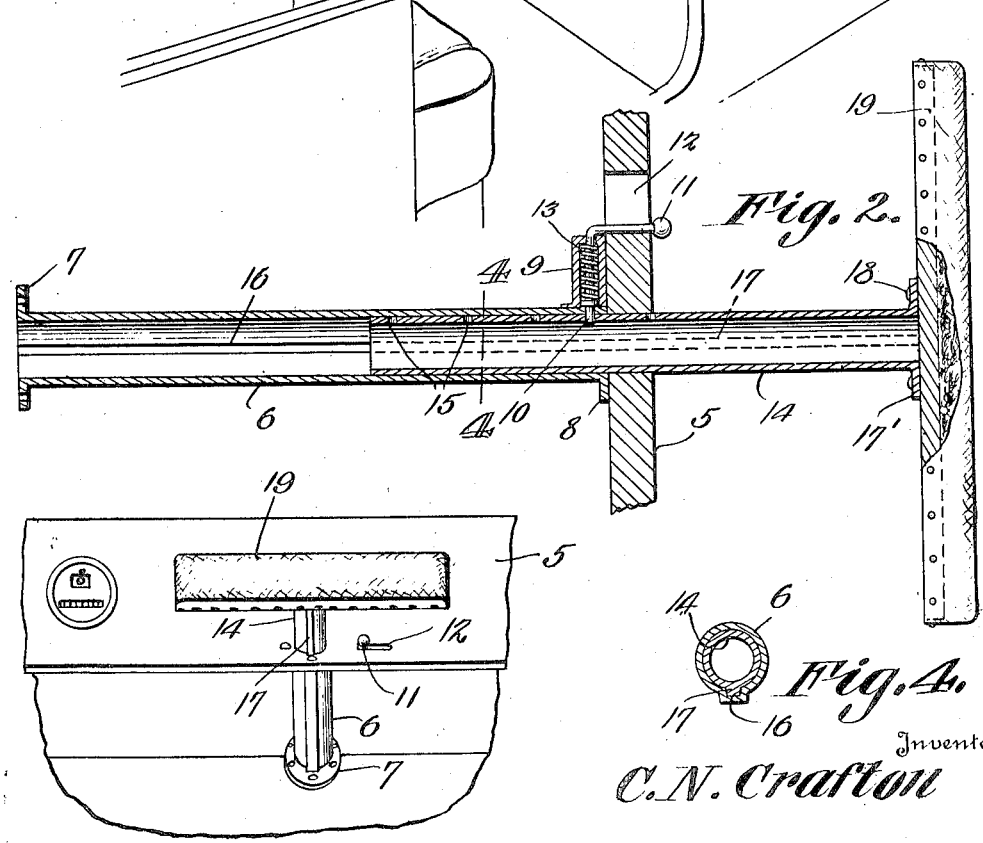
Figure 2 is a longitudinal sectional view through the device.
Figure 3:
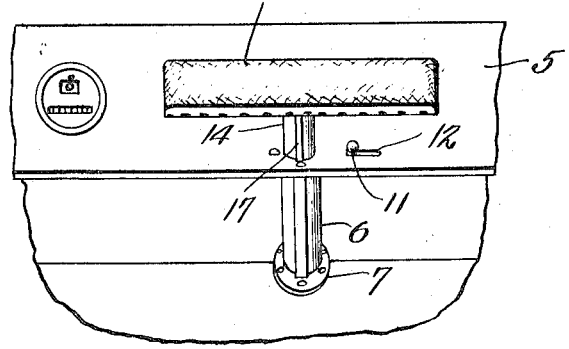
Figure 3 is a front elevational view of the device.
Figure 4:
Figure 4 is a sectional view taken on line 4—4 of Figure 2.

As clearly shown by Figure 2 of the drawing, the padded member 19 is relatively wide, and when in its active position, is disposed in front of the person seated on the front seat adjacent to the driver, to the end that should the vehicle be suddenly stopped, the occupant of the seat adjacent to the driver, will not be thrown suddenly forward, but will be prevented from moving forwardly by the contact of his body with the padded member 19.

In the use of the device, the padded member 19 is moved outwardly to a position as shown by Figure 1 of the drawing with the result that the device will act as a guard in a manner as previously described.

I claim:—

A guard of the class described comprising a tubular member having flanges formed at its ends, the flange at one end of the tubular member adapted to be secured to the floor board of a motor vehicle, the flange at the opposite end of the tubular member being adapted to be secured to the under side of an instrument board, said tubular member having a groove formed throughout its length, an elongated tubular body portion having a rib adapted to move in the groove to prevent rotary movement of the body portion, an elongated padded member carried at the outer end of the tubular body portion to be gripped by a person using the guard, and means for holding the tubular body portion in various positions of adjustment with respect to the tubular member.

In testimony that I claim the foregoing as my own, I have hereto affixed my signature in the presence of two witnesses.

CHARLES N. CRAFTON.

Witnesses:
I. E. STROBEL,
J. R. PATTISON.